(12) United States Patent
Marlin et al.

(10) Patent No.: US 8,088,699 B2
(45) Date of Patent: Jan. 3, 2012

(54) BSAS POWDER

(75) Inventors: Samuel Noël Patrice Marlin, Plan d'Orgon (FR); Howard Wallar, Rutland, MA (US)

(73) Assignee: Saint-Gobain Centre de Recherches et d'Etudes Europeen, Courbevoie (FR)

( * ) Notice: Subject to any disclaimer, the term of this patent is extended or adjusted under 35 U.S.C. 154(b) by 833 days.

(21) Appl. No.: 12/030,225

(22) Filed: Feb. 13, 2008

(65) Prior Publication Data

US 2009/0202735 A1 Aug. 13, 2009

(51) Int. Cl.
*C03C 10/06* (2006.01)
*C03C 3/04* (2006.01)
*C03C 3/062* (2006.01)

(52) U.S. Cl. ................. 501/8; 501/53; 501/73

(58) Field of Classification Search ............... 501/8, 53, 501/73
See application file for complete search history.

(56) References Cited

FOREIGN PATENT DOCUMENTS

JP          09-301737       * 11/1997

* cited by examiner

*Primary Examiner* — Shuangyi Abu Ali
(74) *Attorney, Agent, or Firm* — Young & Thompson

(57) ABSTRACT

The invention provides a powder comprising at least 95% by number of fused grains, with the following chemical composition, as a percentage by weight based on the oxides, for a total of 100%:
  $0 \leq BaO \leq 40.8\%$;
  $0 \leq SrO \leq 31.8\%$;
  $27.2\% \leq Al_2O_3 \leq 31.3\%$;
  $32\% \leq SiO_2 \leq 36.9\%$;
  other species $\leq 1\%$;
the quantity of at least one of the oxides BaO and SrO being more than 0.3%, the size of said grains being such that $D_5 \geq 5$ µm and $D_{95} \leq 150$ µm.

27 Claims, 3 Drawing Sheets

BSAS POWDER

Composite materials based on silicon carbide (SiC), particularly SiC—SiC composites, have high temperature mechanical properties that are of particular utility in applications such as gas turbines, heat exchangers, internal combustion engines, etc.

However, in aqueous environments, i.e. in the presence of water and/or steam, silicon carbide-based composites have a tendency to degrade, as is especially described in United States patent U.S. Pat. No. 6,254,935. To protect those composites, an environmental barrier coating is conventionally applied, in particular in the form of a series of layers of barium-strontium aluminosilicate (BSAS). Advantageously, a BSAS environmental barrier coating prevents the composites from degrading too quickly in an aqueous oxidizing environment, especially in the presence of steam, at high temperature.

The use of BSAS as an environmental barrier coating element is, for example, described in United States patent application US 2005/238888, U.S. Pat. Nos. 6,787,195, 7,226,668 or in the article "Residual stresses and their effects on the durability of environmental barrier coating for SiC ceramics", by Kang N. Lee et al, J. Am. Ceram. Soc, 88 [12] 3483-3488 (2005) or in the article "Upper temperature limit of environmental barrier coating based on Mullite and BSAS" by Kang N. Lee et al, J. Am. Ceram. Soc, 86 [8] 1299-1306 (2003).

The environmental barrier coating may be manufactured using various techniques, in particular by plasma spraying or impregnation starting from a sol-gel solution or a slip, then heat treatment. The powders used may be mixtures of different base oxides of BSAS or precursors of those oxides, or powdered BSAS particles formed, for example, by sintering such mixtures of powders. During plasma spraying, the starting materials are sprayed onto the substrate in the form of fine droplets where they cool very rapidly, thus forming an environmental barrier coating with a lamellar structure, which is more than 90% by volume amorphous, as described in U.S. Pat. No. 6,254,935.

There is an ongoing need for more effective environmental barrier coatings based on BSAS and for methods of manufacturing such environmental barrier coatings.

One aim of the invention is to satisfy this need.

SUMMARY OF THE INVENTION

In accordance with the invention, this aim is achieved by a powder comprising at least 95%, preferably at least 99%, more preferably substantially 100% by number of fused and preferably cast grains, said grains having the following chemical composition, termed "composition in accordance with the invention", as percentages by weight based on the oxides, for a total of 100%:

- $0 \leq BaO \leq 40.8\%$, preferably $4.6\% \leq BaO \leq 37.2\%$, preferably $25.9\% \leq BaO \leq 35.4\%$, preferably $29.8\% \leq BaO \leq 33.6\%$, more preferably BaO: substantially equal to 31.7%;
- $0 \leq SrO \leq 31.8\%$, preferably $2.8\% \leq SrO \leq 28.2\%$, preferably $4.2\% \leq SrO \leq 11.7\%$, preferably $5.7\% \leq SrO \leq 8.6\%$, more preferably substantially equal to 7.1%;
- $27.2\% \leq Al_2O_3 \leq 31.3\%$, preferably $27.5\% \leq Al_2O_3 \leq 30.8\%$, preferably $27.7\% \leq Al_2O_3 \leq 28.7\%$, preferably $27.9\% \leq Al_2O_3 \leq 28.3\%$, more preferably $Al_2O_3$: substantially equal to 28.1%;
- $32\% \leq SiO_2 \leq 36.9\%$, preferably $32.4\% \leq SiO_2 \leq 36.3\%$, preferably $32.7\% \leq SiO_2 \leq 33.8\%$, preferably $32.9\% \leq SiO_2 \leq 33.3\%$, more preferably $SiO_2$: substantially equal to 33.1%.
- other species: $\leq 1\%$, preferably $\leq 0.7\%$, more preferably $\leq 0.5\%$;

the quantity of at least one of the oxides BaO and SrO, or even the quantity of each of these oxides, being greater than 0.3%, the size of said grains (with a composition in accordance with the invention) being such that $D_5 \geq 5$ μm and $D_{95} \leq 150$ μm.

Melting the starting materials, which is necessary to manufacture this powder, leads to a distribution of the various oxides in the grains which is more homogeneous than the distribution of said oxides in the sintered particles used in the prior art. It also means that the distribution of the various oxides between the powder grains is more homogeneous.

These effects of melting are further enhanced when the molten liquid has been held in this form for several seconds, preferably for at least 10 seconds, preferably at least one minute.

Without wishing to be bound by this theory, the inventors consider that this high homogeneity of the powder and the grains of powder improve the service life of the environmental barrier coating, in particular in an aqueous environment.

Said homogeneity can enhance the chemical uniformity of the deposit. Thus, it results in greater thermal expansion homogeneity than with a barrier obtained with prior art powders. This reduces the number of micro-cracks in the BSAS layer formed, which provides better protection for the substrate from aggressive elements, in particular steam. The better chemical homogeneity for the barrier obtained from a powder of the invention can also advantageously enable the construction of more reliable service life models.

Preferably, grains having a composition in accordance with the invention represent more than 97% by weight, preferably more than 99%, more preferably more than 99.9%, preferably 100% of the particles of the powder of the invention.

The powder of the invention may also include one or more of the following optional characteristics:

- the median size $D_{50}$ of the powder is more than 20 μm and/or less than 40 μm; a median size of about 30 μm is highly suitable;
- the grain size $D_5$ may be more than 5 μm, or even more than 10 μm, or even more than 45 μm and/or the grain size $D_{95}$ may be less than 140 μm, or even less than 125 μm or less than 75 μm;
- in a variation, the grain size $D_5$ may be more than 10 μm and/or the grain size $D_{95}$ may be less than 45 μm, the median size $D_{50}$ then preferably being in the range 10 μm to 15 μm;
- the grains are at least partially crystallized, especially in the celsian and hexacelsian phases. In particular, the powder of the invention may comprise more than 90%, preferably more than 95%, more preferably more than 99% by number, or even be constituted by grains in which the celsian and hexacelsian phases in total represent more than 10% by volume, or even more than 15% or even more than 20% by volume of said grains;
- the molar composition of the grains is as follows:

$$(BaO)_{1-x'} (SrO)_{x'} Al_2O_3.SiO_2 \qquad (1)$$

in which $0 \leq x \leq 1$, preferably $0.1 \leq x \leq 0.9$, preferably $0.15 \leq x \leq 0.4$, more preferably $0.2 \leq x \leq 0.3$;

in one implementation, the powder contains less than 1% by weight of mullite, preferably less than 0.1% of mullite, or even no mullite.

The invention also provides a method of manufacturing a powder of the invention, comprising the following steps:

a) preparing a starting charge comprising BSAS precursors, preferably at least partially in the solid form, preferably all in the solid form;

b) melting the starting charge to form a molten liquid;

c) solidifying the molten liquid after optionally casting the molten liquid;

d) optionally, granulometric reduction, in particular by milling and/or granulometry selection and/or de-ironing and/or atomization and/or agglomeration then consolidation by heat treatment;

the parameters of the method, especially the starting charge, and in particular the nature and the quantity of precursors for the starting charge, being determined so as to obtain a powder in accordance with the invention at the end of step c) or step d).

Advantageously, said method can be used to manufacture grains of BSAS in a manner which is more productive than sintering methods. The grains also advantageously have high chemical homogeneity, i.e. substantially all of the grains of the powder have a substantially identical chemical composition.

The powder obtained by this method is very pure, and in particular it contains no mullite. Advantageously, this purity can reduce the rate of corrosion in steam.

In step b), melting can in particular be carried out using a plasma torch, a plasma furnace, an induction furnace or, as is preferable, an arc furnace. Preferably, the melt hold time is more than 10 seconds, preferably more than 1 minute, which excludes the use of a plasma torch.

The invention also provides a method of manufacturing an environmental barrier coating, in particular to protect the walls of a gas turbine, a heat exchanger or an internal combustion engine, by flame spraying or plasma spraying a material obtained from a starting mixture comprising a powder in accordance with the invention.

The starting mixture may contain only grains in accordance with the invention, but in a variation, other grains may be added, in particular grains of mullite. Said other grains may in particular encourage dilatometric matching between the substrate and the environmental barrier coating of BSAS.

Finally, the invention provides a gas turbine, a heat exchanger and an internal combustion engine comprising an environmental barrier coating obtained from a powder of the invention.

As can be seen in more detail in the remainder of the description, said environmental barrier coating advantageously exhibits very high chemical homogeneity and is particularly durable.

BRIEF DESCRIPTION OF THE FIGURES

Other characteristics and advantages become clearer from the following description and the accompanying drawings in which.

DEFINITIONS

Figure 1:
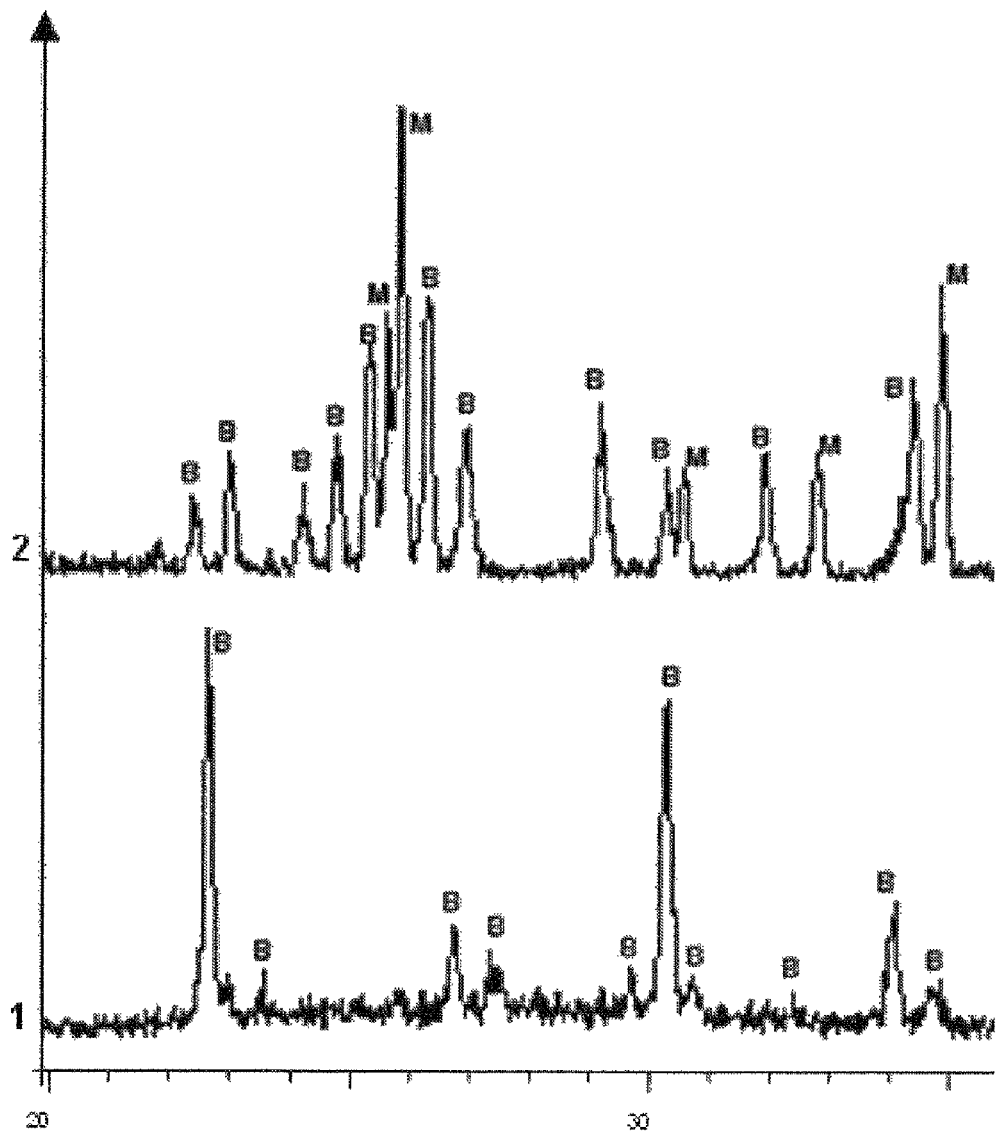
FIG. 1 shows X ray diffraction diagrams obtained for a powder of a comparative example (reference "2") and for a powder in accordance with the invention (reference "1")), the abscissa showing the angular range 2θ under consideration, the diffraction peaks marked "B" being the diffraction peaks for BSAS and the diffraction peaks marked "M" being the diffraction peaks for mullite.
Figure 2:
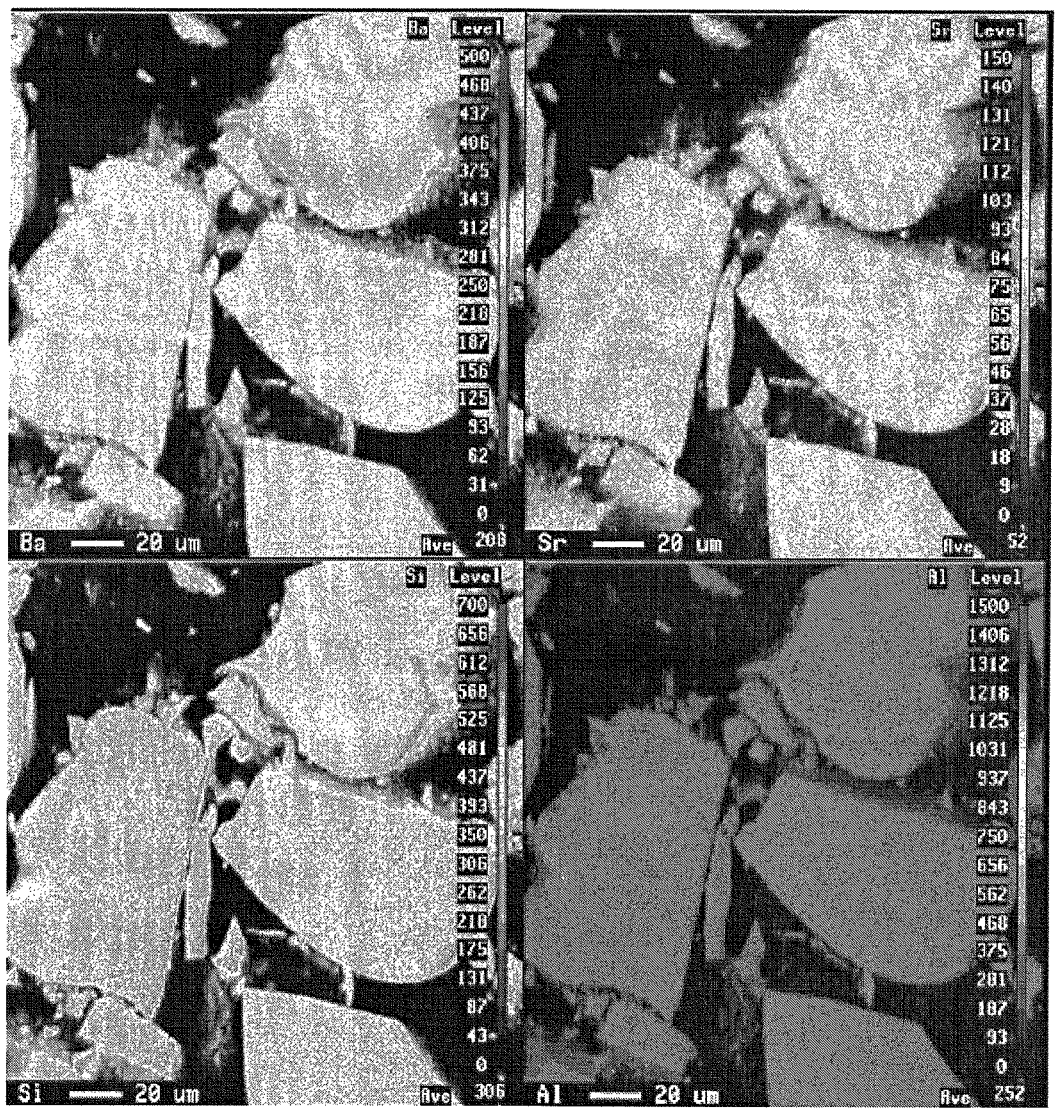
FIGS. 2 and 3 show maps of a powder of the invention and a prior art powder respectively. Four photographs for each map show the distribution of the elements barium, strontium, silicon and aluminum.

The percentiles or "centiles" 5 ($D_5$), 10 ($D_{10}$), 50 ($D_{50}$), 90 ($D_{90}$), and 95 ($D_{95}$) are the grain sizes corresponding to volume percentages of 5%, 10%, 50%, 90% and 95% respectively on the cumulative granulometric distribution curve for the powder grain size, the grain sizes being classified in increasing order. As an example, 10% by volume of the grains of the powder have a size of less $D_{10}$ and 90 % by volume of the grains have a size of more $D_{10}$. The percentiles may be determined using a granulometric distribution produced using a laser granulometer. $D_{50}$ corresponds to the "median size" of an assembly of grains, i.e. the size dividing the grains of this assembly into first and second populations of equal volume, said first and second populations comprising only grains with respectively a larger or smaller size than the median size.

The term "grain size" means the grain size conventionally given by granulometric distribution characterization carried out with a laser granulometer. The laser granulometer used here is a Microtrac® S3500 from MICROTRAC®.

The term BSAS "precursor" means a constituent wherein at least one of the elements may be incorporated into the BSAS of a grain of the invention during its manufacture. Examples of precursors are sintered BSAS particle powders used in the prior art and powders of alumina, silica, BaO, $BaCO_3$, SrO, and $SrCO_3$.

The term "impurities" means inevitable constituents which are necessarily introduced with the starting materials or which result from reactions with said constituents. The impurities are not necessary constituents, but are merely tolerated. The "other species" constituting the complement to 100% of grains having a composition in accordance with the invention include the impurities, and preferably are constituted by impurities.

The term "fused product" means a product obtained by solidification of a molten liquid by cooling.

The term "cast product" means a product obtained by a method in which a molten liquid is prepared then cast, for example into a mold, to cool. It may also be cast into a liquid or be used to produce a stream of molten liquid. Blowing, for example with a gas, may then be carried out across this stream to produce droplets.

A "molten liquid" is a liquid mass, which might contain some solid particles, but in a quantity which is not sufficient to provide said mass with structure.

In formula (1) giving the preferred molar composition of the grains of the invention, $0 \leq x \leq 1$.

When x is zero, the grains of the invention are constituted by strontium aluminosilicate (SAS). When x is 1, the grains of the invention are constituted by barium aluminosilicate (BAS). For the sake of clarity, in the present description, the term "BSAS" means all BSAS, SAS or BAS products having a composition in accordance with the invention, and in particular products with a composition in accordance with formula (1) even if x=0 or x=1.

To manufacture a powder in accordance with the invention, a procedure comprising method steps a) to d) which are described below may be followed.

In step a), the precursor powders are mixed so as to constitute a substantially homogeneous mixture.

Preferably, the precursors comprise and preferably are constituted by oxides, especially BaO, SrO, $SiO_2$ and $Al_2O_3$, and/or precursors of said oxides, for example in the form of a carbonate or nitrate, and/or powders of BSAS in accordance with the prior art.

In the invention, the skilled person adjusts the composition of the starting charge to obtain, at the end of melting step b), a mass of molten liquid with a composition which is in accordance with that of the grains of the invention.

The chemical analysis of the grains is generally substantially identical to that of the starting charge, at least insofar as it relates to the elements Ba, Sr, Al and Si. Further, if appropriate, for example to account for the presence of volatile oxides, or to account for the loss of $SiO_2$ when melting is carried out under reducing conditions, the skilled person knows how to adapt the composition of the starting composition accordingly.

Preferably, no ingredients other than BaO, SrO, $SiO_2$, $Al_2O_3$, precursors of these oxides and a powder of BSAS particles in accordance with the prior art, especially sintered or obtained by spray pyrolysis, are intentionally introduced into the starting charge, the other oxides present being impurities.

In step b), the starting charge is melted, preferably in an electric arc furnace. Electromelting allows large quantities of product to be manufactured in good yields. However, any known type of furnace may be envisaged, such as an induction furnace, a solar furnace or a plasma furnace, provided that they can melt the starting charge, preferably completely. The conditions may be oxidizing or reducing, preferably oxidizing. However, if melting is carried out in a reducing atmosphere, it will subsequently be necessary to carry out a heat treatment in an oxygen-containing atmosphere to re-oxidize the BSAS powder obtained.

To obtain a properly oxidized powder, then it is preferable to carry out melting under oxidizing conditions.

Preferably, melting under oxidizing conditions is carried out using short arcs.

In step b), melting is preferably carried out by the combined action of an electric arc, which may be short or long, producing no reduction, and stirring to encourage re-oxidation of the products.

The arc melting method described in French patent FR-A-1,208,577 and its patents of addition, numbers 75893 and 82310, all incorporated by reference, may be used.

That method consists of using an electric arc furnace wherein the arc travels between the charge and at least one electrode separated from said charge and adjusting the arc length so that its reducing action is reduced to a minimum, while maintaining an oxidizing atmosphere above the molten liquid and stirring said liquid either by the action of the arc itself or by bubbling an oxidizing gas (air or oxygen, for example) in the liquid or by adding substances which release oxygen, such as peroxides, to the liquid.

The liquid resulting from melting is preferably kept molten for a minimum period, preferably of more than 10 seconds, more preferably more than 1 minute, to encourage chemical homogenization thereof. The melt hold time of more than 10 seconds can produce a particularly homogeneous liquid prior to casting. In contrast, the droplets obtained by plasma spraying during the manufacture of prior art environmental barrier coatings are conventionally formed by melting a powder of sintered grains or a mixture of powdered BSAS oxide precursors, but are cooled practically immediately after melting, which does not encourage chemical homogenization.

In step c), the molten liquid is preferably cast. It may be cast into a mold, into a cooling liquid, for example water, or it may be dispersed, for example by blowing; all of those methods are well known.

In particular, a thin stream of molten liquid may be dispersed into small liquid droplets most of which, due to surface tension, assume a substantially spherical shape. Said dispersion may be achieved by blowing, especially with air and/or steam, or using any other method of atomizing a molten material which is known to the skilled person. The resulting cooling of the dispersion results in solidification of the liquid droplets. Grains of fused and cast BSAS are obtained with a conventional size of 0.1 mm [millimeter] to 4 mm.

In a variation, the molten liquid may be cast into water without blowing.

In one implementation, the cooling rate is adjusted to crystallize at least 10% by volume, or even at least 20% by volume of the material during solidification. Thus, a too abrupt cooling must be avoided or a crystallization heat treatment must be provided.

In step d), the size of the fused and cast products obtained in step c) is optionally adjusted. To this end, the fused and cast blocks or grains may be milled then sorted granulometrically.

Before the granulometric sorting operation, which may be carried out by sieving or by separation using air, the particles may undergo a de-ironing treatment to reduce or eliminate magnetic particles which may have been introduced into the BSAS powder during the milling step.

After step c) or, if appropriate, after step d), the powder may also be further transformed by atomization, or by agglomeration then consolidation by heat treatment, to adapt it perfectly to the envisaged application.

In particular as regards spraying applications, the grain size $D_5$ is preferably more than 5 μm, or even more than 10 μm, or even more than 45 μm and/or the grain size $D_{95}$ is less than 140 μm, or even less than 125 μm or even less than 75 μm. Preferably, the sizes are selected as a function of the desired thickness and porosity for the environmental barrier coating, and may in particular be in the following micron ranges $D_5$-$D_{95}$: 10-63; 5-25; 10-45; 45-75; 45-125.

Particularly as regards applications involving casting a slip, the grain size $D_{95}$ is preferably less than 45 μm, the median diameter preferably being in the range 10 μm to 15 μm.

The powder of the invention may be amorphous if cooling has been very rapid, or partially crystallized. In contrast to amorphous grains, partially crystallized grains are not transparent. In particular, the powder of the invention may include more than 90%, or even more than 95% or even more than 99% by number or even be constituted by grains in which the celsian and hexacelsian phases in total represent more than 10% by volume, or even more than 15% or even more than 20% by volume.

The quantity of celsian and hexacelsian phases is conventionally determined by powder X ray diffraction using Rietveld's method with an external standard and using Briendley's correction.

The standard deviation "σ" in the estimation of the homogeneity of the distribution of an oxide in a grain may be evaluated by "n" measurements or "points" at randomly selected positions in the grain, as follows:

$$\sigma = \sqrt{\frac{1}{n}\sum_{i=1}^{n}(z_i - \bar{z})^2},$$

where $z_i$ designates the weight content of the oxide under consideration, measured locally at the position of point "i" in the grain; and $\bar{z}$ designates the mean weight content of the oxide under consideration in the grain, obtained by arithmetically averaging the values $z_i$, i.e:

$$\left( \bar{z} = \frac{1}{n} \sum_{i=1}^{n} z_i \right)$$

Preferably n is more than 3, more preferably more than 5, still more preferably more than 10.

The relative standard deviation or "variation coefficient", denoted $\sigma_R$, expressed as the percentage of the mean, is calculated as follows:

$$\sigma_R = 100 \times (\sigma/\bar{z})$$

In one implementation of the invention, more than 80%, or even more than 90% by weight, more than 95%, more than 99% and even substantially 100% of the grains have the following relative standard deviations $\sigma_R$:
- for $SiO_2$: $\sigma_{R\ SiO2}$ is less than 4%, preferably less than 3%, preferably less than 1%, more preferably less than 0.5%; and
- for $Al_2O_3$: $\sigma_{R\ Al2O3}$ is less than 4%, preferably less than 3%, preferably less than 1%, more preferably less than 0.5%; and
- for BaO: $\sigma_{R\ BaO}$ is less than 15%, preferably less than 10%, preferably less than 3%, more preferably less than 1%; and
- for SrO: $\sigma_{R\ SrO}$ is less than 15%, preferably less than 10%, preferably less than 3%, more preferably less than 1%.

In one implementation of the invention, more than 40%, by weight, or even more than 60%, more than 80%, more than 95%, more than 99%; and even substantially 100% of the grains have the following relative standard deviations $\sigma_R$:
- for $SiO_2$: $\sigma_{R\ SiO2}$ is less than 3%, preferably less than 1%, more preferably less than 0.5%; and
- for $Al_2O_3$: $\sigma_{R\ Al2O3}$ is less than 3%, preferably less than 1%, more preferably less than 0.5%; and
- for BaO: $\sigma_{R\ BaO}$ is less than 10%, preferably less than 3%, more preferably less than 1%; and
- for SrO: $\sigma_{R\ SrO}$ is less than 10%, preferably less than 3%, more preferably less than 1%.

In one implementation of the invention, more than 20%, by weight, or even more than 30%, more than 40%, more than 50%, or even more than 60% of the grains have the following relative standard deviations $\sigma_R$:
- for $SiO_2$: $\sigma_{R\ SiO2}$ is less than 1%, more preferably less than 0.5%; and
- for $Al_2O_3$: $\sigma_{R\ Al2O3}$ is less than 1%, more preferably less than 0.5%; and
- for BaO: $\sigma_{R\ BaO}$ is less than 3%, more preferably less than 1%; and
- for SrO: $\sigma_{R\ SrO}$ is less than 3%, more preferably less than 1%.

In one implementation of the invention, more than 10% by weight, or even more than 15%, more than 20%, more than 25% or even more than 30% of the grains have the following relative standard deviations $\sigma_R$:
- for $SiO_2$: $\sigma_{R\ SiO2}$ is less than 0.5%; and
- for $Al_2O_3$: $\sigma_{R\ Al2O3}$ is less than 0.5%; and
- for BaO: $\sigma_{R\ BaO}$ is less than 1%; and
- for SrO: $\sigma_{R\ SrO}$ is less than 1%.

The standard deviation "$\sigma'$" in determining the homogeneity of the distribution of an oxide between the various grains in a powder may be determined by "n'" measurements carried out on randomly selected grains of the powder, as follows:

$$\sigma' = \sqrt{\frac{1}{n'} \sum_{i=1}^{n'} (z'_i - \bar{z'})^2},$$

where $z'_i$ designates the amount by weight of the oxide in grain "i" of the powder, optionally calculated as an arithmetic mean of several local measurements on the grain; and $\bar{z'}$ designates the mean amount by weight of the oxide under consideration in the "n'" selected grains. This amount is obtained by arithmetically averaging the values $z'_i$, i.e:

$$\left( \bar{z'} = \frac{1}{n'} \sum_{i=1}^{n'} z'_i \right)$$

Preferably n' is more than 5, preferably 10 or more. The relative standard deviation is thus $\sigma_R' = 100 \times (\sigma'/\bar{z'})$ Preferably, in accordance with the invention, the relative standard deviations $\sigma_R'$ for the oxide contents of the powder, considering only grains having at least 0.3% of $SiO_2$, at least 0.3% of $Al_2O_3$ and at least 0.3% of at least one of the oxides BaO and SrO, are such that:
- for $SiO_2$: $\sigma'_{R\ SiO2}$ is less than 4%, preferably less than 2%, preferably less than 1.5%, more preferably less than 1%; and
- for $Al_2O_3$: $\sigma'_{R\ Al2O3}$ is less than 4%, preferably less than 2%, preferably less than 1.5%, more preferably less than 1%; and
- for BaO: $\sigma'_{R\ BaO}$ is less than 15%, preferably less than 10%, preferably less than 6%, more preferably less than 1%; and
- for SrO: $\sigma'_{R\ SrO}$ is less than 15%, preferably less than 10%, preferably less than 6%, more preferably less than 1%.

A powder in accordance with the invention may be used to manufacture an environmental barrier coating, especially to protect the walls of a gas turbine, a heat exchanger or an internal combustion engine, by flame spraying or plasma spraying.

To this end, the powder is conventionally molten then sprayed in the form of fine droplets onto the wall to be protected, where they solidify by rapid cooling.

In one implementation, the droplets are sprayed onto an intermediate layer, for example of mullite, $SiO_2$, mullite plus barium-strontium aluminosilicate, mullite plus yttrium silicate, mullite plus calcium aluminosilicate or silicon metal. This intermediate layer may itself be fixed to the wall to be protected via a binding layer, for example metallic silicon, deposited on this wall, preferably pre-cleaned, for example by shot blasting. Before depositing the BSAS layer, the intermediate layer may undergo a heat treatment, for example at about 1250° C., for about 24 hours.

In certain applications, the sprayed material is obtained by melting a mixture of a powder in accordance with the invention and other powders, in particular a mullite powder.

Thermal spraying may be carried out at a temperature in the range 870° C. to 1200° C.

The thickness of the environmental barrier coating may be more than 10 µm or more than 50 µm, or even more than 75 µm and/or less than 750 µm, or even less than 125 µm.

Any known method of manufacturing an environmental barrier coating may be envisaged, in particular those described in U.S. Pat. Nos. 6,254,935 or 6,387,456, hereby incorporated by reference The following non-limiting examples are provided to illustrate the invention.

In these examples, the following starting materials were selected; the percentages given are percentages by weight:
- alumina powder $Al_2O_3$ (trade name AR75), sold by ALCAN, with a purity of more than 99% by weight and with a median size $D_{50}$ of 90 μm;
- $BaCO_3$ powder sold by SPCH, with an EDTA purity of more than 99% by weight and with more than 98% passing through a 45 μm sieve;
- $SrCO_3$ powder sold by SPCH with an EDTA purity of more than 96% by weight and with more than 99% by weight passing through a 45 μm sieve;
- sedimentary silica sand, sold by SIFRACO, with a granulometry of 0 mm to 1 mm.

A starting charge of 50 kg [kilograms] having the following chemical composition, as percentages by weight, was prepared from the above starting materials:

| | |
|---|---|
| $Al_2O_3$ | 25% |
| $SiO_2$ | 29.5% |
| $BaCO_3$ | 36.5% |
| $SrCO_3$ | 9% |

The starting charge obtained was cast into a Héroult arc fusion furnace. Short arc fusion was carried out to melt all of the mixture completely and homogeneously. Oxidizing production conditions were employed. The tension applied was 450 volts on start-up, then 325 volts in the steady state. The applied energy was about 1800 kWh/T [kilowatt hours/tonne] of starting materials. The molten liquid temperature measured during casting was in the range 1900° C. to 2100° C.

The molten liquid was then cast into water at ambient temperature. The product obtained was in the form of pieces of a few millimeters, dark in color and not transparent.

Next, these pieces were milled in a jaw crusher, then in a roll mill with a set pressure in the rollers of 15 bars.

Granulometric selection was then carried out by sieving to select grains of powder with a size in the range 100 μm to 250 μm and those with a size of less than 100 μm. The 100-250 μm fraction was milled in a jar mill with a zirconia ball partially stabilized with magnesia, for 30 minutes. Sieving was carried out to select grains with a size of less than 100 μm. Next, the two selected powders with sizes less than 100 μm were combined and underwent an air turbine classification step to select grains of the powder with a size in the range 10 μm to 45 μm.

The powder in the comparative example was a commercially available prior art sintered BSAS grain powder with a $D_{90}$ of 55.5 μm, a $D_{50}$ of 31.2 μm and a $D_{10}$ of 16.7 μm.

Chemical analyses and X ray diffraction diagrams, especially for identifying the crystalline phases, were carried out on samples milled to a median size $D_{50}$ of less than 40 μm and representative of the powder obtained.

X ray fluorescence and microprobe chemical analysis were carried out.

Table 1 shows the compositions by weight of the test powders and the phases identified.

TABLE 1

| | $Al_2O_3$ (%) | $SiO_2$ (%) | BaO (%) | SrO (%) | Impurities (%) | Crystalline phases |
|---|---|---|---|---|---|---|
| Comparative example | 48.3 | 29.4 | 18.2 | 3.5 | 0.6 | mullite and BSAS |
| Example 1 | 27.9 | 32.5 | 32.5 | 6.6 | 0.4 | BSAS |

Table 2 summarizes the principal impurities:

TABLE 2

| | CaO (%) | $Fe_2O_3$ (%) | $K_2O$ (%) | $ZrO_2$ (%) | $Na_2O$ (%) | NiO (%) | $TiO_2$ (%) | MgO (%) |
|---|---|---|---|---|---|---|---|---|
| Comparative example | 0.02 | <0.03 | n.d. | 0.13 | 0.12 | n.d. | <0.02 | <0.05 |
| Example 1 | 0.05 | 0.06 | 0.01 | 0.14 | 0.08 | 0.03 | 0.01 | 0.02 | n.d.: not determined.

In the powder of the invention, substantially 100% of the grains simultaneously included $SiO_2$, $Al_2O_3$, SrO, and BaO. In the powder of the comparative example, less than 90% of the grains simultaneously exhibited these four oxides. The chemical homogeneity between the various grains of the powder of the invention is thus remarkable.

FIG. 1 shows that the powder of the comparative example (diagram 2) contained mullite, in contrast to the test powder of the invention, where substantially 100% of the grains were grains of BSAS.

Figure 3:
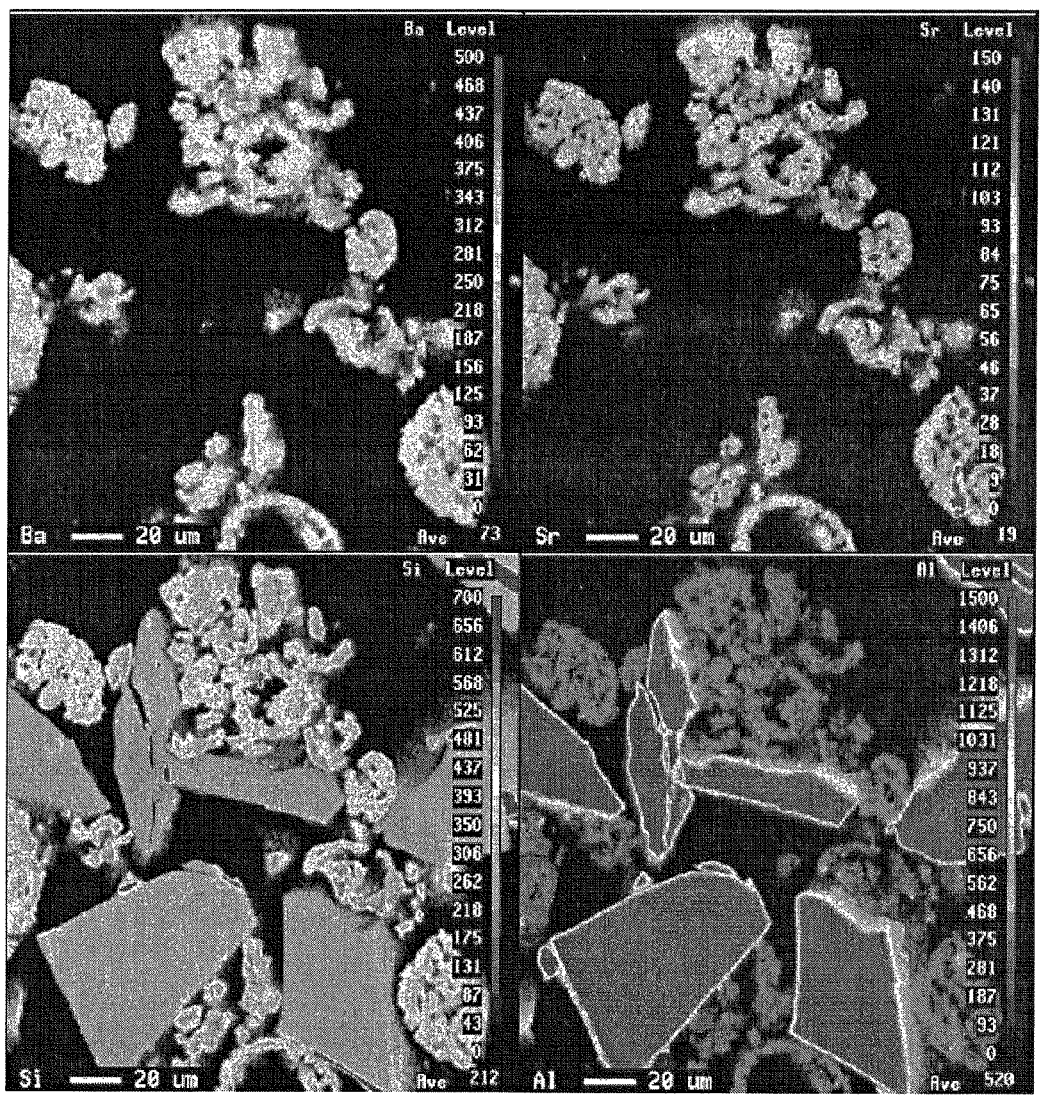

As can be seen from the various photographs of FIG. 3, the test powder of the invention was single-phased and particularly homogeneous. In contrast, as can be seen in FIG. 4, the prior art technique powder was constituted by two types of grains with very different morphologies and compositions.

Table 3 illustrates the chemical homogeneity within the grains of the test powder of the invention, and Table 4 summarizes the chemical analyses carried out in the grains of prior art BSAS powder.

TABLE 3

| Grains "i" | % by weight | Point n° 1 | Point n° 2 | Point n° 3 | Point n° 4 | Point n° 5 | Mean $\overline{z}$ or $z'_i$ | Standard deviation σ | Relative standard deviation $\sigma_R$ (%) |
|---|---|---|---|---|---|---|---|---|---|
| Grain n° 1 | % $Al_2O_3$ | 28.1 | 28.3 | 28.2 | 28.2 | 28.1 | 28.2 | 0.07 | 0.25 |
| | % $SiO_2$ | 32.5 | 32.5 | 32.8 | 32.7 | 32.8 | 32.6 | 0.15 | 0.46 |
| | % BaO | 32.4 | 32.2 | 32.1 | 32.0 | 32.1 | 32.1 | 0.15 | 0.46 |
| | % SrO | 7.1 | 7.1 | 7.0 | 7.1 | 7.0 | 7.0 | 0.05 | 0.71 |
| Grain n° 2 | % $Al_2O_3$ | 28.5 | 28.4 | 28.6 | 28.3 | 28.5 | 28.5 | 0.12 | 0.44 |
| | % $SiO_2$ | 33.0 | 32.8 | 33.0 | 32.8 | 32.9 | 32.9 | 0.09 | 0.26 |
| | % BaO | 31.9 | 32.0 | 31.7 | 32.1 | 31.9 | 31.9 | 0.17 | 0.52 |
| | % SrO | 6.6 | 6.8 | 6.8 | 6.8 | 6.7 | 6.7 | 0.09 | 1.32 |
| Grain n° 3 | % $Al_2O_3$ | 28.1 | 28.2 | 28.1 | 28.2 | 28.4 | 28.2 | 0.11 | 0.39 |
| | % $SiO_2$ | 32.9 | 33.3 | 32.8 | 33.2 | 33.0 | 33.0 | 0.22 | 0.65 |

TABLE 3-continued

| Grains "i" | % by weight | Point n° 1 | Point n° 2 | Point n° 3 | Point n° 4 | Point n° 5 | Mean $\bar{z}$ or $z'_i$ | Standard deviation $\sigma$ | Relative standard deviation $\sigma_R$ (%) |
|---|---|---|---|---|---|---|---|---|---|
| | % BaO | 32.2 | 31.7 | 32.1 | 31.8 | 31.8 | 31.9 | 0.24 | 0.76 |
| | % SrO | 6.8 | 6.8 | 6.9 | 6.8 | 6.8 | 6.8 | 0.07 | 0.99 |
| Grain n° 4 | % Al$_2$O$_3$ | 28.2 | 28.3 | 27.8 | 28.3 | 28.2 | 28.2 | 0.21 | 0.75 |
| | % SiO$_2$ | 33.1 | 32.5 | 32.4 | 32.4 | 32.5 | 32.6 | 0.31 | 0.95 |
| | % BaO | 31.5 | 31.9 | 32.2 | 32.0 | 32.3 | 32.0 | 0.32 | 1.01 |
| | % SrO | 7.2 | 7.3 | 7.6 | 7.3 | 7.1 | 7.3 | 0.19 | 2.54 |
| Grain n° 5 | % Al$_2$O$_3$ | 28.4 | 28.3 | 28.2 | 28.0 | 28.2 | 28.2 | 0.14 | 0.48 |
| | % SiO$_2$ | 32.3 | 32.6 | 32.5 | 32.8 | 32.7 | 32.6 | 0.18 | 0.56 |
| | % BaO | 32.1 | 32.0 | 32.1 | 32.2 | 32.1 | 32.1 | 0.07 | 0.21 |
| | % SrO | 7.2 | 7.1 | 7.2 | 7.0 | 7.0 | 7.1 | 0.12 | 1.65 |
| Grain n° 6 | % Al$_2$O$_3$ | 28.2 | 28.2 | 28.2 | 28.5 | 28.1 | 28.2 | 0.14 | 0.49 |
| | % SiO$_2$ | 32.8 | 33.2 | 33.0 | 32.5 | 32.9 | 32.9 | 0.25 | 0.76 |
| | % BaO | 32.1 | 31.7 | 31.8 | 32.2 | 32.1 | 32.0 | 0.20 | 0.63 |
| | % SrO | 6.9 | 6.9 | 7.0 | 6.8 | 6.9 | 6.9 | 0.05 | 0.75 |
| Grain n° 7 | % Al$_2$O$_3$ | 28.3 | 29.7 | 28.4 | 28.1 | 28.2 | 28.5 | 0.66 | 2.30 |
| | % SiO$_2$ | 32.9 | 31.9 | 32.6 | 32.6 | 33.2 | 32.7 | 0.48 | 1.47 |
| | % BaO | 31.8 | 31.5 | 31.8 | 32.3 | 31.6 | 31.8 | 0.31 | 0.98 |
| | % SrO | 7.0 | 6.9 | 7.1 | 7.0 | 7.0 | 7.0 | 0.08 | 1.15 |
| Grain n° 8 | % Al$_2$O$_3$ | 28.8 | 28.4 | 28.5 | 28.4 | 28.4 | 28.5 | 0.16 | 0.58 |
| | % SiO$_2$ | 32.8 | 32.8 | 33.1 | 32.7 | 32.8 | 32.8 | 0.15 | 0.44 |
| | % BaO | 32.4 | 33.2 | 31.8 | 33.4 | 32.0 | 32.6 | 0.69 | 2.11 |
| | % SrO | 6.0 | 5.6 | 6.7 | 5.5 | 6.8 | 6.1 | 0.58 | 9.47 |
| Grain n° 9 | % Al$_2$O$_3$ | 28.4 | 28.2 | 28.1 | 29.6 | 28.4 | 28.5 | 0.60 | 2.11 |
| | % SiO$_2$ | 32.7 | 32.9 | 32.8 | 31.5 | 32.5 | 32.5 | 0.55 | 1.69 |
| | % BaO | 32.1 | 31.9 | 32.2 | 31.8 | 32.2 | 32.0 | 0.18 | 0.57 |
| | % SrO | 6.9 | 7.0 | 6.9 | 7.0 | 6.8 | 6.9 | 0.08 | 1.11 |
| Grain n° 10 | % Al$_2$O$_2$ | 28.1 | 28.7 | 27.6 | 28.3 | 28.3 | 28.2 | 0.40 | 1.42 |
| | % SiO$_2$ | 32.5 | 32.6 | 34.2 | 32.8 | 32.4 | 32.9 | 0.73 | 2.23 |
| | % BaO | 32.3 | 31.6 | 31.2 | 31.9 | 32.2 | 31.8 | 0.47 | 1.49 |
| | % SrO | 7.1 | 7.1 | 7.0 | 7.1 | 7.1 | 7.1 | 0.04 | 0.57 |

TABLE 4

(prior art)

| Grains "i" | % by weight | Point n° 1 | Point n° 2 | Point n° 3 | Point n° 4 | Point n° 5 | Mean $\bar{z}$ or $z'_i$ | Standard deviation $\sigma$ | Relative standard deviation $\sigma_R$ (%) |
|---|---|---|---|---|---|---|---|---|---|
| Grain n° 1 | % Al$_2$O$_3$ | 31.6 | 29.5 | 29.6 | 29.7 | 28.7 | 29.8 | 1.07 | 3.57 |
| | % SiO$_2$ | 29.9 | 32.8 | 32.6 | 33.0 | 32.9 | 32.2 | 1.33 | 4.13 |
| | % BaO | 30.7 | 30.2 | 30.5 | 30.3 | 30.4 | 30.4 | 0.20 | 0.66 |
| | % SrO | 7.9 | 7.5 | 7.3 | 7.0 | 8.1 | 7.6 | 0.42 | 5.55 |
| Grain n° 2 | % Al$_2$O$_3$ | 28.5 | 30.3 | 28.4 | 28.4 | 28.3 | 28.8 | 0.84 | 2.91 |
| | % SiO$_2$ | 33.3 | 32.9 | 33.4 | 33.6 | 33.4 | 33.3 | 0.24 | 0.73 |
| | % BaO | 30.4 | 30.6 | 29.8 | 30.3 | 30.3 | 30.3 | 0.32 | 1.06 |
| | % SrO | 7.8 | 6.2 | 8.5 | 7.7 | 8.0 | 7.6 | 0.87 | 11.43 |
| Grain n° 3 | % Al$_2$O$_3$ | 30.5 | 29.7 | 29.3 | 29.6 | 28.8 | 29.6 | 0.63 | 2.12 |
| | % SiO$_2$ | 32.8 | 33.3 | 33.2 | 33.3 | 33.5 | 33.2 | 0.26 | 0.79 |
| | % BaO | 30.2 | 30.2 | 29.9 | 29.8 | 29.8 | 30.0 | 0.17 | 0.56 |
| | % SrO | 6.5 | 6.8 | 7.5 | 7.2 | 7.8 | 7.2 | 0.77 | 10.76 |
| Grain n° 4 | % Al$_2$O$_3$ | 30.1 | 28.0 | 30.2 | 28.8 | 28.5 | 29.1 | 0.97 | 3.35 |
| | % SiO$_2$ | 32.5 | 33.6 | 33.0 | 33.0 | 33.4 | 33.1 | 0.43 | 1.30 |
| | % BaO | 30.9 | 30.3 | 30.6 | 30.6 | 30.7 | 30.6 | 0.22 | 0.71 |
| | % SrO | 6.6 | 8.1 | 6.2 | 7.6 | 7.4 | 7.2 | 0.77 | 10.76 |
| Grain n° 5 | % Al$_2$O$_3$ | 28.4 | 27.8 | 28.5 | 29.5 | 27.5 | 28.3 | 0.75 | 2.63 |
| | % SiO$_2$ | 34.1 | 33.9 | 33.6 | 33.2 | 34.2 | 33.8 | 0.39 | 1.17 |
| | % BaO | 30.9 | 31.2 | 31.1 | 31.0 | 30.7 | 31.0 | 0.19 | 0.60 |
| | % SrO | 6.6 | 7.1 | 6.8 | 6.3 | 7.5 | 6.9 | 0.46 | 6.68 |
| Grain n° 6 | % Al$_2$O$_3$ | 30.7 | 31.0 | 28.5 | 29.7 | 30.2 | 30.0 | 0.97 | 3.23 |
| | % SiO$_2$ | 32.5 | 31.3 | 32.6 | 32.7 | 32.6 | 32.3 | 0.59 | 1.84 |
| | % BaO | 30.6 | 30.6 | 30.3 | 30.6 | 30.5 | 30.5 | 0.17 | 0.57 |
| | % SrO | 6.2 | 7.1 | 8.6 | 7.1 | 6.9 | 7.2 | 0.89 | 12.35 |
| Grain n° 7 | % Al$_2$O$_3$ | 27.5 | 28.7 | 27.8 | 27.9 | 27.9 | 28.0 | 0.42 | 1.50 |
| | % SiO$_2$ | 35.2 | 34.6 | 35.0 | 34.8 | 34.6 | 34.9 | 0.25 | 0.73 |
| | % BaO | 30.6 | 30.4 | 30.7 | 30.7 | 30.8 | 30.6 | 0.14 | 0.46 |
| | % SrO | 6.7 | 6.3 | 6.4 | 6.6 | 6.7 | 6.5 | 0.19 | 2.87 |
| Grain n° 8 | % Al$_2$O$_3$ | 29.2 | 29.0 | 29.5 | 29.3 | 27.8 | 29.0 | 0.66 | 2.27 |
| | % SiO$_2$ | 31.0 | 30.7 | 31.3 | 31.5 | 16.0 | 28.1 | 6.74 | 24.00 |
| | % BaO | 27.5 | 26.8 | 28.8 | 28.5 | 5.6 | 23.4 | 10.00 | 42.67 |
| | % SrO | 12.3 | 13.6 | 10.5 | 10.7 | 50.5 | 19.5 | 17.38 | 89.15 |

TABLE 4-continued (prior art)

| Grains "i" | % by weight | Point n° 1 | Point n° 2 | Point n° 3 | Point n° 4 | Point n° 5 | Mean $\bar{z}$ or $z'_i$ | Standard deviation σ | Relative standard deviation $\sigma_R$ (%) |
|---|---|---|---|---|---|---|---|---|---|
| Grain n° 9 | % $Al_2O_3$ | 27.5 | 28.4 | 26.8 | 27.4 | 28.1 | 27.6 | 0.64 | 2.30 |
| | % $SiO_2$ | 35.0 | 34.3 | 35.4 | 35.0 | 34.5 | 34.8 | 0.41 | 1.18 |
| | % BaO | 30.7 | 30.4 | 30.4 | 30.7 | 30.7 | 30.6 | 0.17 | 0.55 |
| | % SrO | 6.7 | 6.9 | 7.4 | 6.9 | 6.7 | 6.9 | 0.27 | 3.94 |
| Grain n° 10 | % $Al_2O_3$ | 29.4 | 28.6 | 27.9 | 28.9 | 28.1 | 28.6 | 0.61 | 2.12 |
| | % $SiO_2$ | 32.9 | 33.2 | 33.7 | 33.1 | 33.4 | 33.2 | 0.31 | 0.92 |
| | % BaO | 30.7 | 30.5 | 30.4 | 30.7 | 30.8 | 30.6 | 0.17 | 0.57 |
| | % SrO | 6.9 | 7.7 | 8.0 | 7.3 | 7.6 | 7.5 | 0.42 | 5.56 |

Finally, Table 5 illustrates the remarkable chemical homogeneity between the various grains of the powder of the invention.

For each oxide under consideration, the mean quantities "$z'_i$" of 10 grains of the tested powder of the invention of Table 3 were averaged to calculate $\bar{z}'$, i.e.

$$\left( \bar{z}' = \frac{1}{10} \sum_{i=1}^{10} z'_i \right).$$

The standard deviation σ' was determined as follows:

$$\sigma' = \sqrt{\frac{1}{10} \sum_{i=1}^{10} (z'_i - \bar{z}')^2}.$$

As an example, for $Al_2O_3$, the mean $\bar{z}'$ was the mean over 10 grains of the means obtained for 5 measuring points on each of these grains.

TABLE 5

Powder of Example 1 of the invention

| | Mean $\bar{z}'$ | Standard deviation σ' | Relative standard deviation $\sigma_R'$ |
|---|---|---|---|
| % $Al_2O_3$ | 28.3 | 0.16 | 0.57 |
| % $SiO_2$ | 32.8 | 0.18 | 0.56 |
| % BaO | 32 | 0.22 | 0.68 |
| % SrO | 6.9 | 0.31 | 4.50 |

The same analysis of the chemical analyses carried out on the 10 prior art grains of Table 4 gave the results shown in Table 6.

Powder of comparative example

| | Mean $\bar{z}'$ | Standard deviation σ' | Relative standard deviation $\sigma_R'$ |
|---|---|---|---|
| % $Al_2O_3$ | 28.9 | 0.78 | 2.7 |
| % $SiO_2$ | 32.9 | 1.91 | 5.79 |
| % BaO | 29.8 | 2.25 | 7.56 |
| % SrO | 8.4 | 3.91 | 46.51 |

As can clearly be seen, the grains of the powder of the invention demonstrate remarkable chemical homogeneity. The powder itself has good homogeneity; practically all of the grains have the same chemical composition. These results explain the good performance of the powders of the invention when incorporated into a starting mixture to provide an environmental barrier coating.

Clearly, the present invention is not limited to the implementations described and shown by way of the non-limiting illustrative examples.

The invention claimed is:

1. A powder comprising at least 95% by number of fused grains, wherein said grins have the following chemical composition, as a percentage by weight based on the oxides for a total of 100%:
   $0 \leq BaO \leq 40.8\%$;
   $0 \leq SrO \leq 31.8\%$;
   $27.2\% \leq Al_2O_3 \leq 31.3\%$;
   $32\% \leq SiO_2 \leq 36.9\%$; and other species $\leq 1\%$;
   at least one of oxides BaO and SrO being more than 0.3%, said grains having a grain size such that $D_5 \geq 5$ μm and $D_{95} \leq 150$ μm.

2. The powder according to claim 1, wherein said grains have the following chemical composition:
   $4.6\% \leq BaO \leq 37.2\%$; and/or
   $2.8\% \leq SrO \leq 28.2\%$; and/or
   $27.5\% \leq Al_2O_3 \leq 30.8\%$; and/or
   $32.4\% \leq SiO_2 \leq 36.3\%$; and/or
   other species $\leq 0.7\%$.

3. The powder according to claim 1, wherein said grains have the following chemical composition:
   $25.9\% \leq BaO \leq 35.4\%$; and/or
   $4.2\% \leq SrO \leq 11.7\%$; and/or
   $27.7\% \leq Al_2O_3 \leq 28.7\%$; and/or
   $32.7\% \leq SiO_2 \leq 33.8\%$; and/or
   other species $\leq 0.5\%$.

4. The powder according to claim 1, wherein said grains have the following chemical composition:
   $29.8\% \leq BaO \leq 33.6\%$; and/or
   $5.7\% \leq SrO \leq 8.6\%$; and/or
   $27.9\% \leq Al_2O_3 \leq 28.3\%$; and/or
   $32.9\% \leq SiO_2 \leq 33.3\%$.

5. The powder according to claim 1, wherein said grains have the following chemical composition:
   BaO: 31.7%; and/or
   SrO: 7.1%; and/or
   $Al_2O_3$: 28.1%; and/or
   $SiO_2$: 33.1%.

6. The powder according to claim 1, wherein said grains have a grain size $D_5$ over 10 μm.

7. The powder according to claim 1, wherein said grains have a grain size $D_{95}$ less than 125 μm.

8. The powder according to claim 1, wherein said grains have a the grain size $D_{95}$ less than 45 μm.

9. The powder according to claim 1, having a median grin size $D_{50}$ of less than 40 μm.

10. The powder according to claim 1, having a median grain size $D_{50}$ in a range of 10 -15 μm.

11. The powder according to claim 1, having a median size $D_{50}$ of greater than 20 μm.

12. The powder according to claim 1, wherein the grains are at least partially crystallized.

13. The powder according to claim 12, wherein said grains have the celsian and hexacelsian phases in total representing more than 10% by volume of said grains.

14. The powder according to claim 13, wherein the celsian and hexacelsian phases in total represent more than 20% by volume of said grains 15. The powder according to claim 1, said grains representing more than 99% by number of particles of said powder.

16. The powder according to claim 1, in which more than 80% by weight of said grains have a chemical homogeneity such that::
the relative standard deviation for the percentage of $SiO_2$ ($\sigma_{RSiO2}$) is less than 4%;
the relative standard deviation for the percentage of $Al_2O_3$ ($\sigma_{RaAl2O3}$) is less than 4%;
the relative standard deviation for the percentage of BaO ($\sigma_{RaBaO}$) is less than 15%; and
the relative standard deviation for the percentage of SrO ($\sigma_{RaSrO}$) is less than 15%; the the relative standard deviation ($\sigma_{Ra}$) being calculated using the following formula:

$$\sigma_R = 100 \times (\sigma/\bar{z}),$$

where $$\sigma = \sqrt{\frac{1}{n}\sum_{i=1}^{n}(z_i - \bar{z})^2}$$

n designates the number of measurements, more than 3, at randomly selected positions in the grain under consideration;
$z_i$ designates the weight content of the oxide under consideration, measured locally in position "i" of the grain under consideration, and
$\bar{z}$ designates the mean weight content of the oxide under consideration in the grain under consideration, obtained by arithmetically averaging the values $z_i$.

17. The powder according to claim 16, wherein:
$\sigma_{R\,SiO2}$ is less than 3%; and/or
$\sigma_{R\,Al2O3}$ is less than 3%; and/or
$\sigma_{R\,BaO}$ is less than 10%; and/or
$\sigma_{R\,SrO}$ is less than 10%.

18. The powder according to claim 1, in which the relative standard deviations ($\sigma_R$)of the percentage of oxides in the powder, considering only grains having at least 32% of $SiO_2$, at least 27.2% of $Al_2O_3$ and at least 0.3% of at least one of the oxides BaO and SrO, and having a grain size being in the range 5 μm to 150 μm, are:
a relative standard deviation for the percentage of $SiO_2$ ($\sigma_{R'SiO2}$) is less than 4%;
a relative standard deviation for the percentage of $Al_2O_3$ ($\sigma_{R'Al2O3}$) is less than 4%;
a relative standard deviation for the percentage of BaO ($\sigma_{R'BaO}$) is less than 15%; and
a relative standard deviation for the percentage of SrO ($\sigma_{R'SrO}$) is less than 15%;
the relative standard deviation ($\sigma_{Ra}$) being calculated using the following formula:

$$\sigma'_R = 100 \times (\sigma'/\bar{z'}),$$

where $$\sigma' = \sqrt{\frac{1}{n'}\sum_{i=1}^{n'}(z'_i - \bar{z'})^2}$$

n' designates a number of grains under consideration, being more than 5,
$z'_i$ designates a weight content of oxide in grain "i" of the powder, and
$\bar{z'}$ designates a mean weight content of the oxide under consideration for the "n'" selected grains.

19. The powder according to claim 18, wherein:
$\sigma_{R'\,SiO2}$ is less than 1.5%; and/or
$\sigma_{R'\,Al2O3}$ is less than 1.5%; and/or
$\sigma'_{R\,BaO}$ is less than 6%; and/or
$\sigma'_{R\,SrO}$ is less than 6%.

20. A method of producing a powder of claim 1, comprising the following steps:
a) preparing a starting charge comprising precursors of barium-strontium aluminosilicate (BSAS);
b) melting the starting charge to form a molten liquid;
c) solidifying molten liquid; and
d) optionally, granulometric reduction and/or granulometric selection and/or de-ironing and/or atomization and/or agglomeration then consolidation by heat treatment;
the starting charge being determined so that at the end of step c) or step d), the powder is in accordance with the powder of claim 1.

21. The method according to claim 20 wherein, in step b), the molten liquid is kept molten for a period of more than 10 seconds.

22. The method according to claim 20 wherein, in step b), the molten liquid is kept molten for a period of more than 1 minute.

23. The method according to claim 20 wherein in step c) comprises of casting the molten liquid to form a thin stream of molten liquid, said stream being dispersed into liquid droplets.

24. A method of producing an environmental barrier coating, comprising flame spraying or plasma spraying a substance obtained from a starting mixture, wherein the starting mixture comprises of the powder according to claim 1.

25. A device selected from the group consisting of: a gas turbine, a heat exchanger and an internal combustion engine, wherein the device has an environmental barrier coating obtained from a powder according to claim 1.

26. The powder according to claim 1, wherein the percentage of $SiO_2$ is $32\% \leq SiO_2 \leq 36.3\%$.

27. The powder according to claim 1, wherein the percentage of $SiO_2$ is $32\% \leq SiO_2 \leq 33.8\%$.

* * * * *